UNITED STATES PATENT OFFICE.

JOSHUA R. HAYES, OF WASHINGTON, DISTRICT OF COLUMBIA, ASSIGNOR OF TWO-THIRDS OF HIS RIGHT TO FRANCIS C. HOOTON AND JOHN RUTTER, OF WEST CHESTER, PENNSYLVANIA.

IMPROVEMENT IN THE MANUFACTURE OF FUEL FROM COAL-WASTE.

Specification forming part of Letters Patent No. 136,375, dated March 4, 1873.

*To all whom it may concern:*

Be it known that I, JOSHUA R. HAYES, of the city of Washington, District of Columbia, have invented a new Process to Manufacture Fuel from Coal-Waste; and that the following is a description of the same.

Pitch or asphaltum, resin, coal-tar, &c., have been used as the cementing agent to utilize the coal-dust for purposes of fuel; but these elements although adhesive do no service in this capacity as soon as fire is applied to the lump, and hence the dust soon falls and a smoldering fire results.

As a preliminary step in my process I convert pitch or asphaltum into a true asphalt by the addition of calcareous earth, or when expedient use the rock asphalt, which is simply pitch united with calcareous earth, and thus obtain a matrix and a durable cement for the coal-dust, that will not be affected by the hottest weather we experience under solar heat, and thus the manufactured fuel can be transported from place to place holding its continuity. This asphalt subserves another very important office, as will be made evident further along in the description of my process for manufacturing this fuel.

I first mix the coal-dust with asphalt, made as described, in the manner we are accustomed to mix sand or broken stone with asphalt for paving purposes, (the coal-dust assuming the place of said sand and broken stone,) and to about the consistence of concrete when used for paving and other purposes. In another vessel or apparatus fitted for the purpose I mix clay, twenty per cent., with one hundred per cent. anthrax or coal-dust with hot water until the whole assumes a pasty mass. This pasty mass in its hot condition (it will not answer when cold) is then thoroughly mixed with the asphalt, made as described, also warm, until the mass is in that condition ready to be put into molds of any size and compressed for use.

The clay, blended with the coal-dust, contracts under heat in combustion, and the finely-divided particles of coal in the dust are thus held firmly together until consumed, so that by the union with clay in the manner I have described, the process of combustion is successfully consummated.

But this clay is absorbent of moisture, so that in transporting the manufactured fuel inconvenience would unavoidably result. This is overcome by the asphalt in its minimum quantity blended throughout the mass, so that a lump of the manufactured fuel, by reason of its partial asphaltic condition will not absorb moisture under exposure to the elements.

By this process I obtain adhesion and exemption from absorption by the combined use of clay and asphalt, while at the same time the process of combustion is fulfilled by the clay hardening and contracting under high heat, thereby holding together all the finely-divided particles of coal-dust until they are consumed.

I claim—

1. The process, as described, of combining calcareous clay and coal-waste with boiling water, and mixed under high heat in order to obtain the minimum of clay, ranging from eight to twelve per cent., for the purpose set forth.

2. The process, as described, of combining said mixture, under high heat, with the minimum of bitumen, ranging from one to four per cent., said bitumen forming with the calcareous clay, automatically, artificial asphalt, in the manner and for the purpose set forth.

J. R. HAYES, M. D.

Witnesses:
   H. S. MILLER,
   JNO. D. PATTEN.